US012756467B1

(12) United States Patent
Zhang et al.

(10) Patent No.: US 12,756,467 B1
(45) Date of Patent: Oct. 6, 2026

(54) CHROMATIC DISPERSION ESTIMATION METHOD FOR COHERENT OPTICAL NETWORK

(71) Applicant: CABLE TELEVISION LABORATORIES, INC., Louisville, CO (US)

(72) Inventors: Junwen Zhang, Shanghai (CN); Zhensheng Jia, Superior, CO (US); Mu Xu, Shoreline, WA (US); Haipeng Zhang, Broomfield, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 311 days.

(21) Appl. No.: 18/663,506

(22) Filed: May 14, 2024

Related U.S. Application Data

(62) Division of application No. 17/585,309, filed on Jan. 26, 2022, now Pat. No. 11,984,928.

(Continued)

(51) Int. Cl.
*H04B 10/2513* (2013.01)
*H04B 10/61* (2013.01)

(52) U.S. Cl.
CPC ... *H04B 10/25133* (2013.01); *H04B 10/6165* (2013.01)

(58) Field of Classification Search
CPC ...................... H04B 10/25133; H04B 10/6165

(Continued)

(56) References Cited

U.S. PATENT DOCUMENTS 6,580,542 B1 * 6/2003 Song ................ H04B 10/25133 398/154
7,636,525 B1 * 12/2009 Bontu .................... H04B 10/60 398/208

(Continued)

FOREIGN PATENT DOCUMENTS

CN 105763282 B 6/2018
JP 2009246586 A * 10/2009 ............ H04J 3/0682

OTHER PUBLICATIONS

Christian et al; Natural Expression of the Best-Match Search Godard Clock-Tone Algorithm for Blind Chromatic Dispersion Estimation in Digital Coherent Receivers; 2012, Optical society of America; pp. 1-2. (Year: 2012).*

(Continued)

*Primary Examiner* — Amritbir K Sandhu
(74) *Attorney, Agent, or Firm* — Cozen O'Connor

(57) ABSTRACT

A method for estimating a chromatic dispersion of an optical-fiber channel is disclosed includes receiving, via the optical-fiber channel, a chromatically-dispersed signal having a symbol rate 1/T. The method also includes, for each chromatic-dispersion value of a plurality of chromatic-dispersion values, determining a respective clock-tone magnitude by: (i) applying, to the chromatically-dispersed signal or a signal derived therefrom, a chromatic dispersion equal to the chromatic-dispersion value to generate a dispersion-compensated signal, and (ii) extracting the clock-tone magnitude from at least one of a positive-frequency clock-tone and a negative-frequency clock-tone of the dispersion-compensated signal, the positive-frequency clock-tone and the negative-frequency clock-tone being spectral components of the dispersion-compensated signal at temporal frequencies 1/T or −1/T respectively. The method also includes determining a maximum of the extracted clock-tone magnitudes. The estimated chromatic dispersion is the chromatic-disper- (Continued)

sion value, of the plurality of chromatic-dispersion values, corresponding to the maximum extracted clock-tone magnitude.

20 Claims, 13 Drawing Sheets

Related U.S. Application Data

(60) Provisional application No. 63/141,831, filed on Jan. 26, 2021.

(58) Field of Classification Search
USPC .................................................. 398/47
See application file for complete search history.

(56) References Cited

U.S. PATENT DOCUMENTS

| | | | | |
|---|---|---|---|---|
| 8,655,191 | B2 * | 2/2014 | Kaneda | H04B 10/60 398/208 |
| 8,712,247 | B2 * | 4/2014 | Hauske | H04L 7/027 398/155 |
| 2013/0039665 | A1 | 2/2013 | Hauske | |
| 2014/0369685 | A1 * | 12/2014 | Calabro | H04L 27/2672 398/65 |
| 2016/0329960 | A1 * | 11/2016 | Yao | H04B 10/61 |
| 2019/0068413 | A1 * | 2/2019 | Xu | H04B 10/6972 |

OTHER PUBLICATIONS

Christian et al; Natural Expression of the Best-Match Search Godard Clock-Tone Algorithm for Blind Chromatic Dispersion Estimation in Digital Coherent Receivers; 2012; Advanced Photonics; pp. 1-2. (Year: 2012).

Oerder, M. et al., "Digital filter and square timing recovery," in IEEE Transactions on Communications, vol. 36, No. 5., pp. 605-612. May 1988.

Sui, Q., et al. "Fast and Robust Blind Chromatic Dispersion Estimation Using Auto-Correlation of Signal Power Waveform for Digital Coherent Systems," J. of Lightwave Technology, vol. 31, No. 11, pp. 306-312, Jan. 2013.

Wang, D., et al., "Adaptive chromatic-dispersion compensation for coherent communication systems using delay-tap sampling technique," IEEE Photonics Technology Letters, vol. 23, No. 14, pp. 1016-1018. Jul. 15, 2011.

Zhang, Y., et al. "Adaptive Blind Chromatic Dispersion Estimation and Compensation for DSP-based Coherent Optical Systems," in 2017 Conference on Lasers and Electro-Optics Pacific Rim, (Optical Society of American, 2017); 5 pages.

* cited by examiner

CHROMATIC DISPERSION ESTIMATION METHOD FOR COHERENT OPTICAL NETWORK

CROSS-REFERENCE TO RELATED APPLICATION

This application is a divisional application of U.S. patent application Ser. No. 17/585,309, filed Jan. 26, 2022, which application claims the benefit of U.S. Provisional Application No. 63/141,831, filed Jan. 26, 2021, the disclosures of which are incorporated herein by reference in their entireties.

BACKGROUND

Accurate fiber chromatic-dispersion compensation is critical for optical coherent receiver with DSP. This dispersion compensation should generally be done before other core signal-recovery DSP functions like synchronization, clock recovery, polarization demultiplexing and carrier recovery. To facilitate accurate chromatic-dispersion compensation, accurate channel information including fiber length, signal wavelength, and fiber dispersion parameters are required. However, in many application scenarios, i.e., new optical network units (ONUs) in passive optical networks (PON) and dynamic switched optical networks, dispersion information of these links are unknown initially or the link may be reconfigured. Therefore, accurate, fast, and simple fiber chromatic dispersion (CD) estimation is desired.

In some scenarios, like coherent PON, it is desired to have fast, accurate and low computation-complexity CD estimation, especially in upstream when a new optical network unit (ONU) gets online. Since fiber dispersion is static, only one-time CD estimation for each ONU is required. In general, ONUs complete the discovery and registration process in the discovery window before data communications, so that CD estimation should be completed during the registration process considering the importance of CD compensation in the core DSP functions.

Since the upstream coherent receiver is a burst-mode receiver in PON, a short preamble length and fast CD estimation time reduces the length of discovery window for new users' registration and hence improve the registration efficiency. Yet, a more robust, and hence slower, CD estimation that tolerates burst signal power leveling and burst signal amplification will further reduce the preamble length and improve the registration efficiency. Accurate CD estimation also reduces the complexity of other channel equalization DSP functions. For instance, the number of channel equalization filter taps can be reduced if accurate CD estimation and compensation is applied.

In some scenarios, like dynamic switching transmission links (wavelength routing or link restoring), it is also necessary to have fast and accurate CD estimation to re-estimate the link chromatic dispersion each time when a new link path is established. Therefore, fast, robust, and low computation-complexity CD estimation can enable fast switching and link restoring.

Existing CD estimation methods either require large number of symbols or very high computation complexity. For instance, over 24K symbols are required for chromatic-dispersion compensation based on delay-tap sample technology [1], 8192 (213) and even 32,768 (215) symbols are required for CD estimation based on spectrum auto-correlation method [2], and multiple times of iterations and over 1048k symbols are required for feed-back based method [3].

SUMMARY OF THE EMBODIMENTS

Embodiments herein include a fast and adaptive CD estimation method based on scanning the strength of clock tone after signal squaring process. The signal squaring process may be extended to the $M^{th}$ power of the signal modulus process as well, where M is a positive integer. The proposed method is suitable for coherent access network as the fiber length and fiber dispersion is limited. Only a few scanning or search steps is sufficient for accurate CD estimation. Furthermore, the scanning processes with calculation of clock-tone strength may be implemented in parallel, which further reduces the estimation time. The proposed method may be used with any PAM/QAM/PSK signals.

In a first aspect a method for estimating a chromatic dispersion of an optical-fiber channel is disclosed. The method includes receiving, via the optical-fiber channel, a chromatically-dispersed signal having a symbol rate 1/T. The method also includes, for each chromatic-dispersion value of a plurality of chromatic-dispersion values, determining a respective clock-tone magnitude by: (i) applying, to the chromatically-dispersed signal or a signal derived therefrom, a chromatic dispersion equal to the chromatic-dispersion value to generate a dispersion-compensated signal, and (ii) extracting the clock-tone magnitude from at least one of a positive-frequency clock-tone and a negative-frequency clock-tone of the dispersion-compensated signal, the positive-frequency clock-tone and the negative-frequency clock-tone being spectral components of the dispersion-compensated signal at temporal frequencies 1/T or −1/T respectively. The method also includes determining a maximum of the extracted clock-tone magnitudes. The estimated chromatic dispersion is the chromatic-dispersion value, of the plurality of chromatic-dispersion values, corresponding to the maximum extracted clock-tone magnitude.

In a second aspect, a method for registering an optical network unit (ONU) with an optical line terminal (OLT) is disclosed. The method includes transmitting a register-request-message signal from the ONU to the OLT via an optical-fiber channel to yield a chromatically-dispersed register-request-message signal received by the OLT. The method also includes recovering a register-request-message signal from the chromatically-dispersed register-request-message signal by applying a chromatic-dispersion estimate to the chromatically-dispersed register-request-message signal.

In a third aspect, an optical network unit includes an optical input port, a photodetector optically coupled to the optical input port, a processor communicatively coupled to the photodetector; and a memory. The memory stores non-transitory computer-readable instructions that, when executed by the processor and cause the processor to execute the method of the first aspect.

DETAILED DESCRIPTION OF THE EMBODIMENTS

1. Principle and Innovative Idea

1.1 Clock-tone Extraction

In Oerder and Meyr's work on digital filter and square timing recovery algorithm [4], the received signal is first squared and then the clock-tone is extracted to calculate the phase of the clock tone, which corresponds to a timing error. Instead of detecting the timing error or calculating the clock phase, embodiments disclosed herein use the signal strength of this clock tone to determine the amount of residual dispersion.

Figure 1:
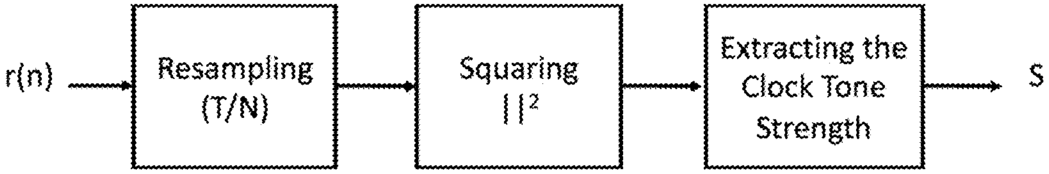
FIG. 1 is a schematic block diagram of a method for extracting clock-tone strength, in an embodiment.

FIG. 1 shows the process of clock-tone extraction to calculate clock-tone strength after signal squaring. Assuming L symbols are used for clock-tone extraction and its strength calculation, the received signal r(n) after resampling to N samples per symbol can be expressed as $$r(n) = r\left(\frac{nT}{N}\right),\ n \in [0, NL-1] \tag{1}$$

After squaring process, the signal can be expressed as $$R(n) = r(n)^2 = \left|r\left(\frac{nT}{N}\right)\right|^2,\ n \in [0, NL-1]. \tag{2}$$

The clock tone can be extracted as the spectra component at ±1/T, as shown in Eqs. (3) and (4), where 1/T is the symbol rate of received signal r(n).

$$x\left(k = \frac{L}{N}\right) = \left|\sum_{n=0}^{NL-1} R(n)e^{\frac{-i2\pi}{NN}n}\right| \tag{3}$$

$$x\left(k = \frac{L-1}{N}\right) = \left|\sum_{n=0}^{NL1} R(n)e^{\frac{-i2\pi(L-1)}{NN}n}\right| \tag{4}$$

Here Eq. 3 and Eq. 4 are the clock-tone at 1/T and −1/T respectively. The strength of the tone can be calculated by adding the two side-bands, and be expressed as:

$$\begin{aligned} S &= x\left(k = \frac{L}{N}\right) + x\left(k = \frac{L-1}{N}\right) \\ &= \left|\sum_{n=0}^{NL-1} R(n)e^{\frac{-i2\pi}{NN}n}\right| + \left|\sum_{n=0}^{NL-1} R(n)e^{\frac{-i2\pi(L-1)}{NN}n}\right|. \end{aligned} \tag{5}$$

Here S is the total signal strength (absolute value) of the clock tone. In embodiments, equation (5) may include just a single sideband: either eq. (3) or eq. (4). Using both sidebands may improve accuracy.

As we mentioned above, the squaring process actually may be extended to the $M^{th}$ power of the signal modulus process, which also transfer the complex signal to the $M^{th}$ power, where M is a positive integer. In this case, the equation (2) can be updated as $$R(n) = |r(n)|^M = \left|r\left(\frac{nT}{N}\right)\right|^M,\ n \in [0, NL-1],\ M > 0. \tag{6}$$

Without departing from the scope hereof, M may be a non-integer and greater than or equal to one.

Figure 2:
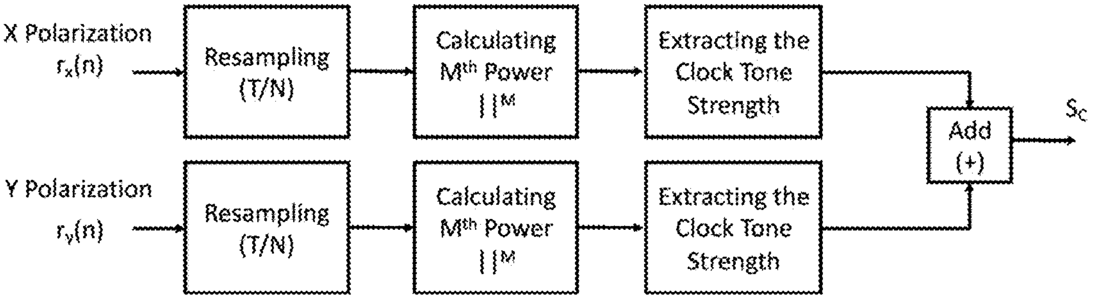
FIG. 2 is a schematic block diagram showing clock-tone extraction to calculate clock-tone strength for dual polarization signals based on $M^{th}$ power of the signal modules, in an embodiment.

When signal r(n) has polarization components $r_x(n)$ and $r_y(n)$, the total clock tone strength may be obtained by combining the signals on both polarizations to enhance the performance. Then, the total, or combined, clock-tone strength is $$S_C = S_x + S_y, \tag{7}$$

where $S_x$ and $S_y$ are the respective calculated clock-tone strengths of polarization components $r_x(n)$ and $r_y(n)$ each computed via Eq. 5. FIG. 2 illustrates a more general process flow of clock-tone extraction for signals with two polarizations. Sc is the combined strength with both x and y polarizations. In the parallel processing, N is the resampling rate (N samples per symbol), and for practical implementation N may be greater than two. Without departing from the scope hereof, subscripts x and y may denote other pairs of orthogonal polarizations, such as right-handed and left-handed circular polarizations.

1.2 CD Estimation by Parallel Scanning Process

Figure 3:
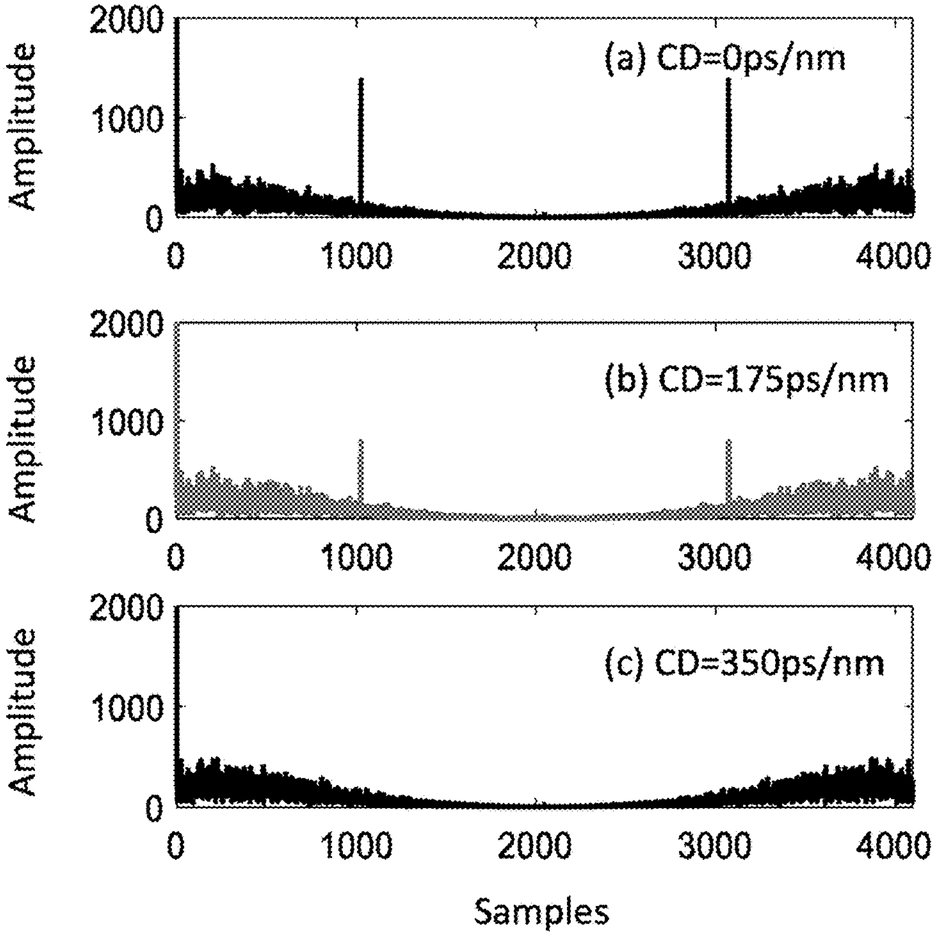
FIG. 3 includes three example frequency-spectrum plots of a squared signal with different respective chromatic dispersion (CD) values, and the effect of CD values on clock-tone amplitudes.

Taking a 100G QPSK (25 GBaud) signal as an example, FIG. 3 shows amplitudes of squared signal $r(n)^2$ different values residual fiber chromatic dispersion. Here, the clock-tone has the strongest signal strength when CD=0; while the clock-tone strength becomes weak when residual CD=170 ps/nm (corresponding to about 10-km fiber in C-band), and the clock-tone totally disappears in the case when residual CD is 350 ps/nm.

Figure 4:
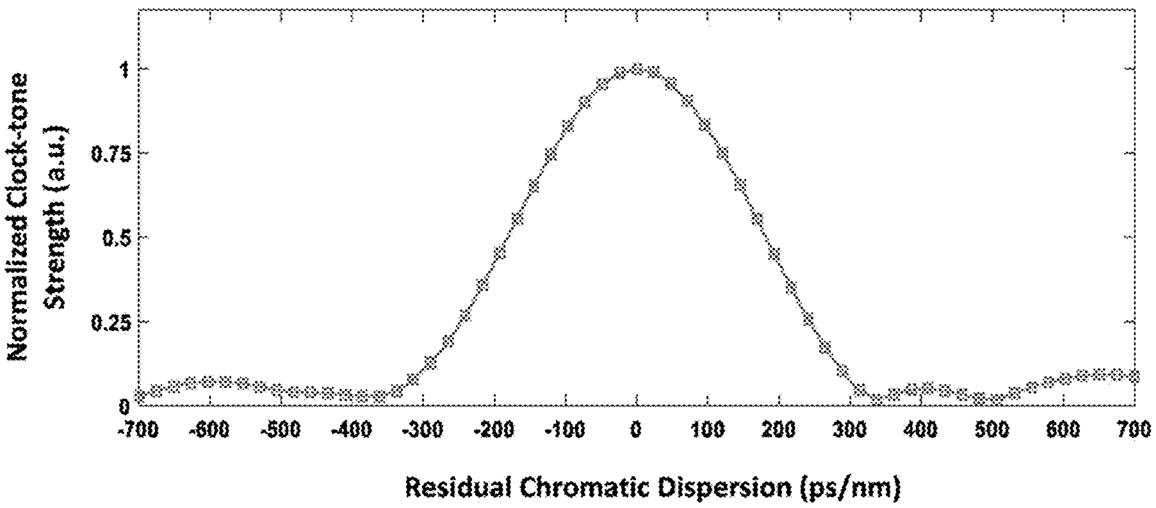
FIG. 4 is a graph showing normalized clock-tone strength as a function of residual chromatic dispersion.

FIG. 4 shows the normalized clock-tone signal strength as a function of residual chromatic dispersion. For a 100G PDM-QPSK signal, the full-width at half-maximum (FWHM) residual dispersion range is within 350 ps/nm (−175 ps/nm to 175 ps/nm), which corresponds to a 20-km range (from −10 km to 10 km in C-band for near 1550 nm wavelengths). FIG. 4 illustrates that the clock-tone strength approaches zero when residual dispersion is out of the range of 750 ps/nm (less than −350 ps/nm or greater than 350 ps/nm).

Figure 5:
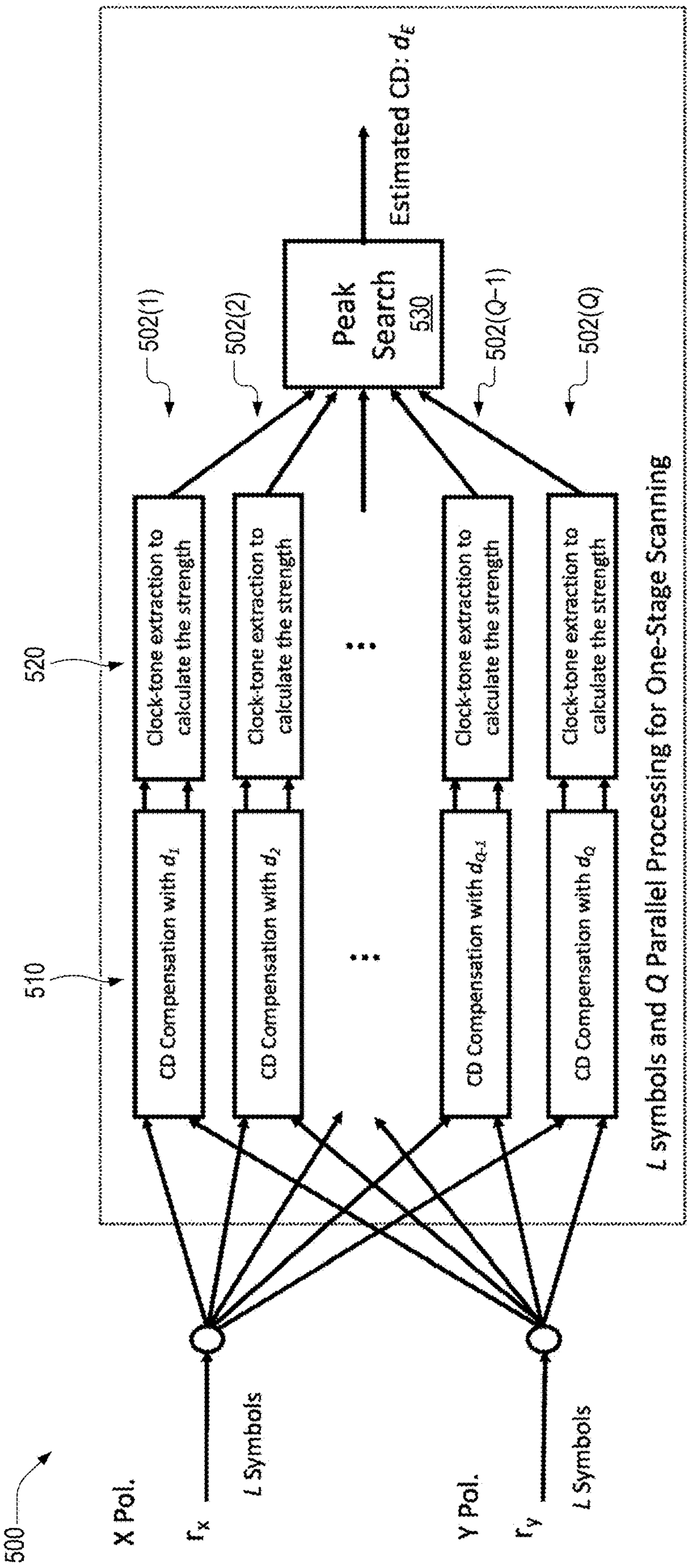
FIG. 5 is a flowchart illustrating a parallel scanning process for chromatic dispersion estimation, in an embodiment.

Embodiments disclosed herein include parallel scanning/search methods to estimate the fiber dispersion based on the relation between clock-tone strength and residual chromatic dispersion. FIG. 5 is a flowchart illustrating a CD estimation method 500 by parallel scanning process. Method 500 includes steps 510, 520, and 530.

L symbols for both X and Y polarization are used for CD estimation, with Q parallel processing paths 502 (1, 2, . . . , Q), each of which include a step 510 and a step 520. In each parallel processing path, chromatic-dispersion compensation is applied first to the L symbols (step 510) by using a range of different dispersion values $[d_1, d_2, \ldots, d_Q]$, and one dispersion value for each processing path. Noting that the sequence of dispersion values may have different distributions for different scanning range and scanning resolution, and one possible way is using equal-spaced scanning step, i.e., [d, 2d, . . . , Qd]. Here, d is the one dispersion unit. After CD compensation, in step 520, the clock-tone extraction is applied to calculate the strength according to FIG. 2 and Eq. 5-7. In step 530, the strongest clock-tone among all the paths is determined by the peak search process, and the path with the strongest clock-tone should be the optimal CD estimation value.

Obviously, the performances of CD estimation, such as accuracy, and estimation range is highly dependent on the estimation symbol length L and the number Q of parallel processing paths. In general, the estimation symbol length L determines the CD estimation range, and path number Q determine the estimation resolution. Together these two parameters determine the CD estimation performance, and also the computation complexity. The larger the numbers, the better performances (better resolution and estimation range), but also the higher computation complexity. In practical, one should balance the computation complexity as well as the performances. For optical access network, as the distance is limited, i.e., less than 80 km, the computation complexity for estimation will be acceptable.

Other processing examples for CD estimation may include two or more stages of estimation. For instance, the first stage can be coarse to find the optimal range, and a subsequent second stage of estimation can be fine search, over a smaller range of different dispersion values determined in the first stage, to improve the overall estimation accuracy. These implementation and extension should be included as examples of this invention idea.

If the estimating range is $R_{CD}$, then, the estimation accuracy is $$\frac{R_{CD}}{Q}$$

when Q paths of parallel processing are used. When a total of 2Q parallel processing paths are used in a single-stage estimation, the estimation accuracy is $$\frac{R_{CD}}{2Q}.$$

The 2Q parallel processing paths yield a better estimate when divided over multiple stages of chromatic dispersion estimation. For example, when the 2Q parallel processing paths are divided equally over two estimation stages, the accuracy is $$\frac{R_{CD}}{Q^2},$$

which is far better than $$\frac{R_{CD}}{2Q}.$$

However, the total estimation time is doubled, although they have the same estimation computation complexity.

Once CD estimation is complete, the receiver, e.g., an ONU, should apply CD compensation based on the estimated CD, and then other signal processing functions for signal recovery. Generally, the CD should be static and won't change. So one-time CD estimation is good enough as long as the fiber link is not changed.

1.3. Implementation Examples

Figure 6:
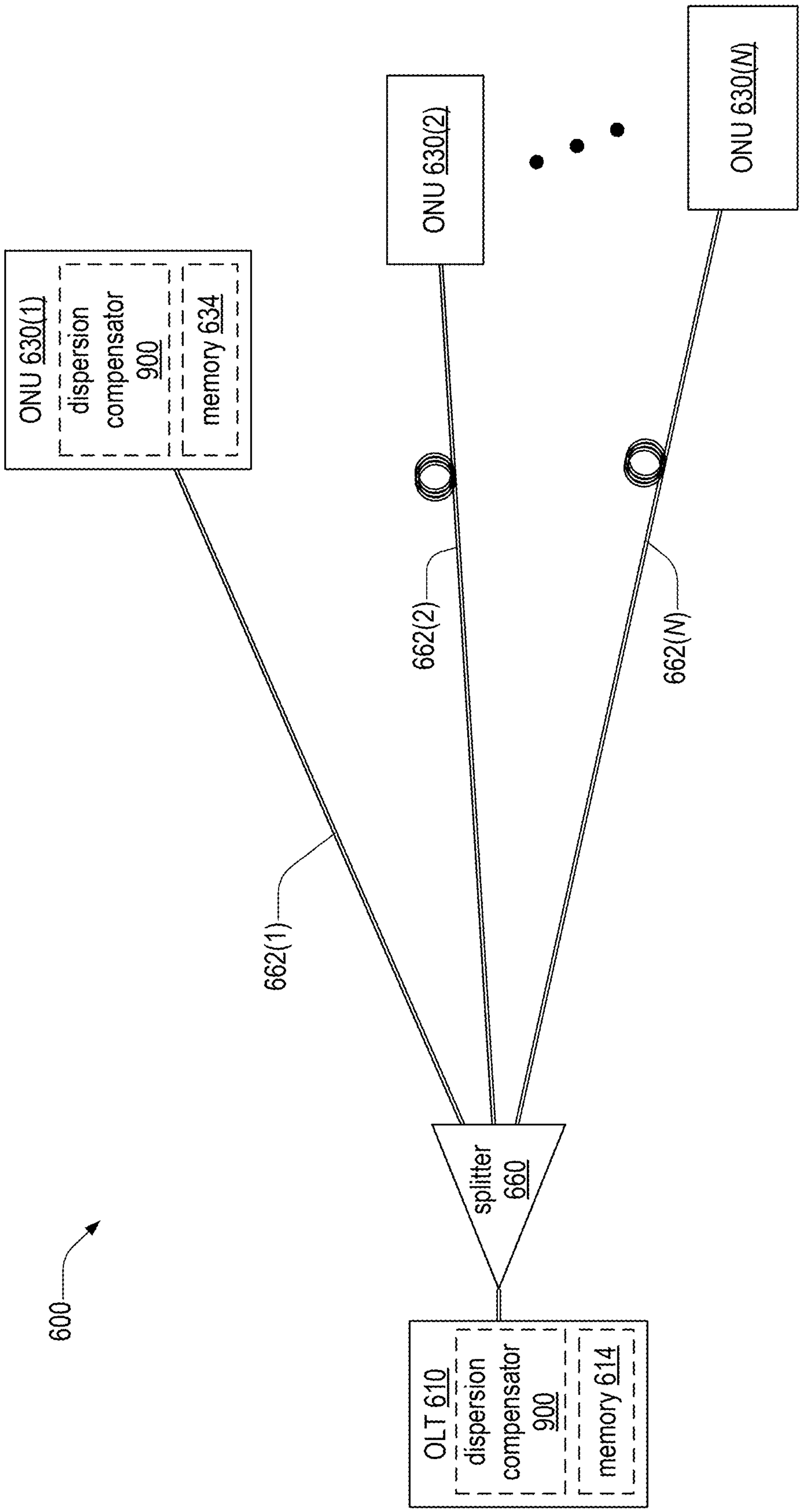
FIG. 6 is a schematic of an optical network that includes ONUs communicatively coupled with an OLT, in an embodiment.

FIG. 6 is a schematic of a passive optical network 600 (PON 600), which may implement chromatic dispersion estimation methods disclosed herein. Optical network 600 includes an OLT 610, a splitter 660, and N ONUs 630(1-N). Each ONU 630(*s*) is communicatively coupled to OLT 610 via a respective optical channel 662(*s*), each of which may be of a different length, where $s \in \mathbb{Z}$,, $s \geq 1$, and $s \leq N$ Splitter 660 may be a demultiplexer or wavelength-selective switch. OLT 610 may include a dispersion compensator 900, which is described in FIG. 9. At least one ONU 630 may include a dispersion compensator 900.

The fiber distance from each ONU 630 to OLT 610 are initially unknown. Therefore, CD estimation is an essential step for each ONU 630 to de-modulate downstream data information from OLT 610. It is also an essential step for OLT 610 to receive the correct information from ONUs 630. Since upstream data transmission is in the burst way, it is advantageous that CD estimation is completed in the discovery initiation and registration process.

OLT 610 may include a memory 614 and ONU 630 may include a memory 634. Each of memory 614 and 634 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof).

Figure 7:
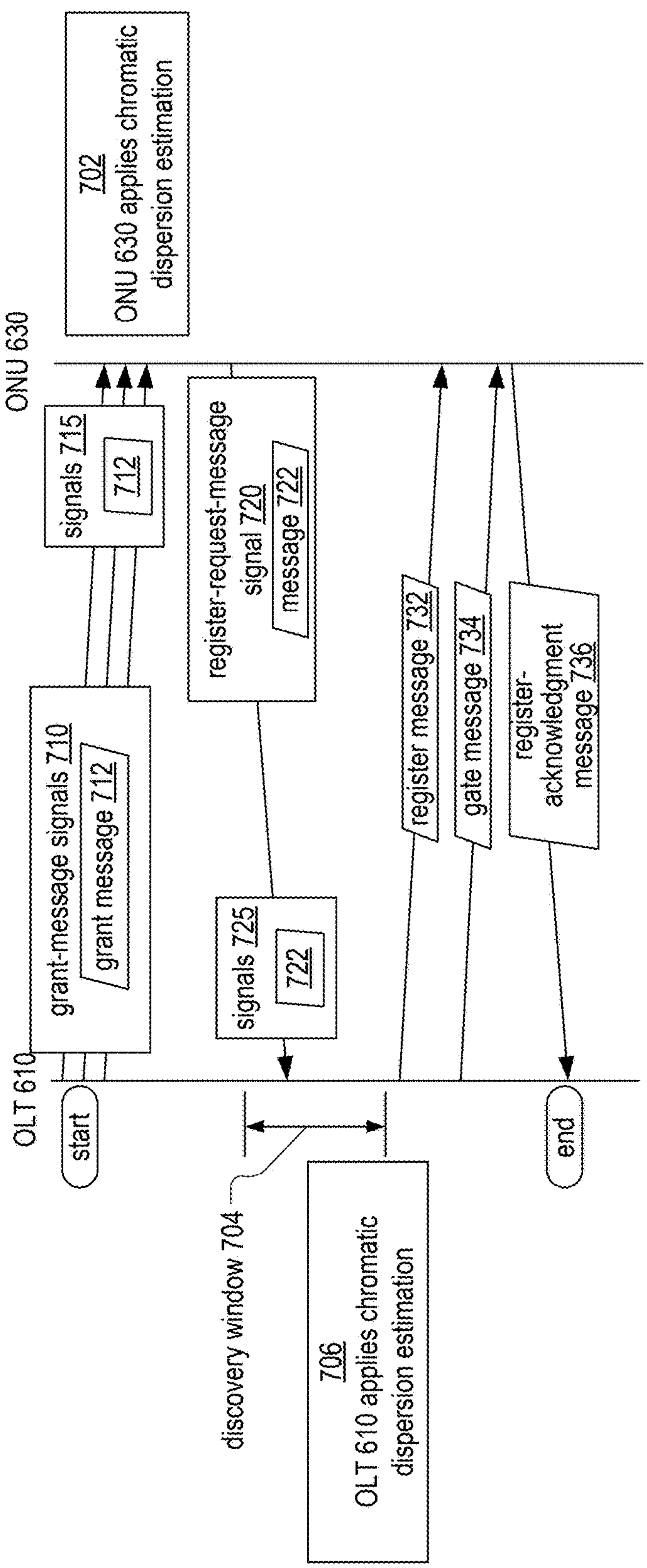
FIG. 7 is a schematic illustration of chromatic dispersion estimation at an OLT and an ONU, in an embodiment.

FIG. 7 is a schematic illustration of chromatic dispersion estimation at OLT 610 and an ONU 630(1), and message exchange therebetween during a registration process. When newly connected or unregistered ONUs 630 are provided access to PON 600, OLT 610 continuously, e.g., periodically, broadcasts grant-message signals 710 to each ONU 630 and creates an available discovery window 704, during which ONU 630(1) may transmit a register-request-message signal 720 to OLT 610. Each grant-message signal includes a grant-message 712. Each grant-message signal 710 arrives at ONU 630 as a chromatically-dispersed signal 715.

In embodiments, ONU 630(1) begins an ONU-side chromatic-dispersion estimation process 702 once it is connected to PON 600 after receiving chromatically-dispersed signals 715. That is, ONU 630(1) correctly demodulates chromatically-dispersed signals 715, e.g., in its PHY layer and read downstream grant-message 712. Upon correctly estimating the CD and applying CD compensation based on the estimation, ONU 630(1) demodulates chromatically-dispersed signals 715 for a discovery window 704. ONU 630(1) may store the estimated chromatic dispersion in memory 634 for use with future CD compensation. Then each ONU 630(1) waits for discovery window 704 to begin and then transmits a register-request message signal 720 to OLT 610 within discovery window 704. Register-request message signal 720 includes a register-request message 722. Register-request message signal 720 arrives at OLT 610 as a chromatically-dispersed signal 725.

Upon receiving register-request message signal 720 from ONU 630(1), OLT 610 begins a OLT side CD estimation process 706 for ONU 630(1) and, based on the estimation, applies CD compensation to register-request message signal 720. After CD estimation in the OLT-side for ONU 630(1), the OLT 610 demodulates chromatically-dispersed signal 725 and reads register request message 722 for ONU 630(1). Upon receipt of a valid register request message 722, OLT 610 registers ONU 630(1) and stores the CD information associated with registered ONU 630(1). The CD information will be applied in future upstream signal receiving and CD compensation for ONU 630(1). Subsequently, OLT 610 follows regular registration process, which includes sending a register message 732 to ONU 630(1). OLT 610 also transmits a gate message 734 to ONU 630, which allows ONU 630 to send back a register-acknowledgement message 736. Upon receipt of register-acknowledgement message 736, the discovery process is complete.

With the fact that signals are continuous in downstream of PON, so the receiver in ONUs will have more time to apply accurate CD estimation; while upstream of PON are in the burst way, OLT-side receiver should act very fast. It is desired to have a successful CD estimation and registration in a short time so that discovery window 704 can be shortened. Hence, ONU-side chromatic-dispersion estimation process 702 may have multiple stages of CD estimation to improve the estimation accuracy by using time resource. Process 702 may include large number of parallel processing paths to improve the accuracy. Alternatively, ONU 630 reports its estimated CD value to OLT 610, so that OLT 610 may use a more accurate CD estimated by ONU 630.

Figure 8:
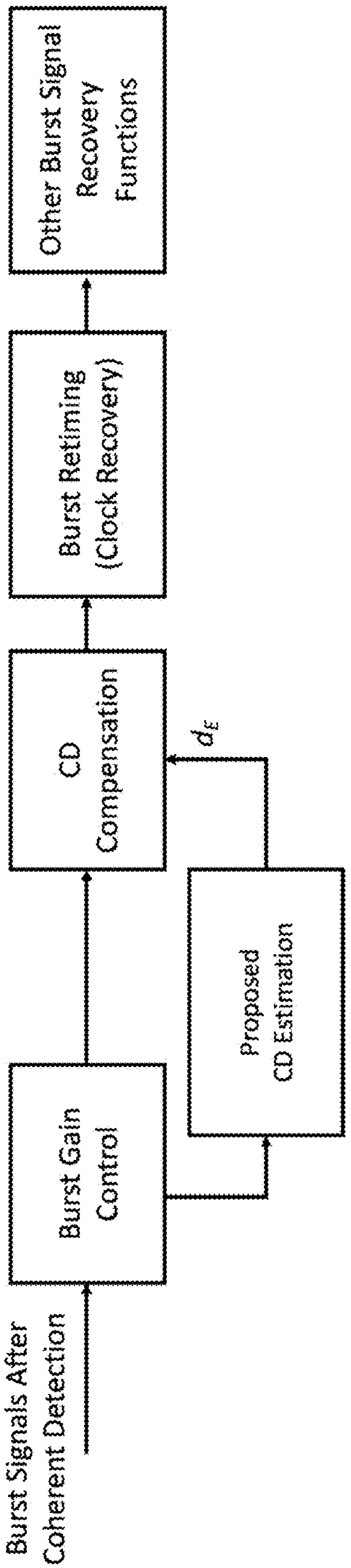
FIG. 8 is a flowchart illustrating chromatic dispersion estimation for upstream burst reception, in an embodiment.

For upstream burst reception, FIG. 8 shows how proposed CD estimation works with other burst signal processing functions. As analyzed above, CD compensation should be applied before many core DSP functions, such as burst retiming or clock recovery and other signal recovery functions (such as channel equalization, carrier recovery and so on). To correctly compensate the CD, we need CD estimation process. The proposed the CD estimation may begin right after burst gain control or during the burst amplification settling process. Since the proposed method is only dependent on the relative clock strength, signals during the burst amplification settling process may also be used for proposed CD estimation, which reduces the overall preamble length.

Generally, the CD is static and does not change for each ONU 630. Hence, a one-time CD estimation for each unregistered ONU 630 is sufficient. However, after an ONU 630 is registered, at least one of OLT 610 and the registered ONU 630 periodically check the estimated CD value.

For other use scenarios, such as reconfigurable optical network, or dynamic switching optical links, CD estimation should be applied each time a link is reconfigured.

Figure 9:
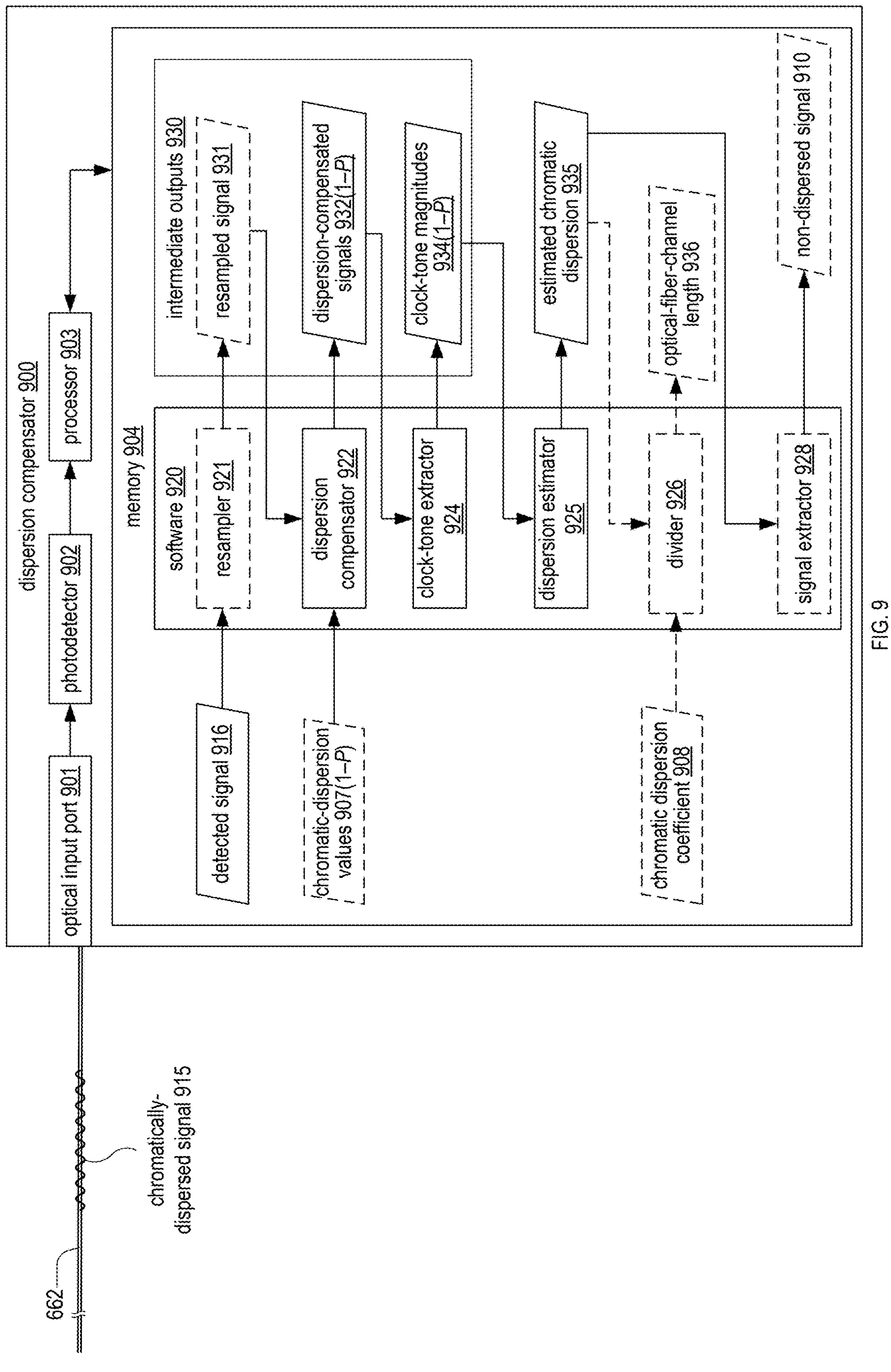
FIG. 9 is a schematic of an optical network unit, which is an example of an ONU of FIG. 6.

FIG. 9 is a schematic of a dispersion compensator 900. Dispersion compensator 900 includes an optical input port 901, a photodetector 902, a processor 903, and a memory 904. In embodiments, one or both of OLT 610 and ONU 630 include dispersion compensator 900. When OLT 610 includes a dispersion compensator 900, memory 904 may be part of memory 614. When ONU 630 includes a dispersion compensator 900, memory 904 may be part of memory 634.

Memory 904 stores non-transitory computer-readable instructions as software 920. When executed by processor 903, software 920 causes processor 903 to implement the functionality of dispersion compensator 900 as described herein. Software 920 may be, or include, firmware.

Memory 904 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 904 may be integrated into processor 903.

Photodetector 902 is optically coupled to optical input port 901, and processor 903 is communicatively coupled to photodetector 902. Software 920 includes a dispersion compensator 922, a clock-tone extractor 924, and a dispersion estimator 925. Software 920 may also include at least one of a resampler 921, a divider 926, and a signal extractor 928.

Dispersion compensator 900 is shown receiving a chromatically-dispersed signal 915 via an optical channel 662. Examples of chromatically-dispersed signal 915 include chromatically-dispersed signals 715 and 725. Memory 904 stores signal 915 as a detected signal 916. Memory 904 may also store at least one of (i) a plurality of chromatic-dispersion values 907(1, 2, . . . , P), and (ii) a chromatic dispersion coefficient 908 of optical channel 662.

Software 920 processes detected signal 916 to generate intermediate outputs 930 and an estimated chromatic dispersion 935 of signal 915. Intermediate outputs 930 include dispersion-compensated signals 932(1-P), clock-tone magnitudes 934(1-P), and, in embodiments, a resampled signal 931. During at least part of a process of determining estimated chromatic dispersion 935, memory 904 stores resampled signal 931, at least one of signals 932(1-P), at least one of signals 934(1-P). Memory 904 may store determining estimated chromatic dispersion 935. In embodiments, at least one of (i) equation (1) is a mathematical expression of resampled signal 931, and (ii) equation (5) is a mathematical expression of a clock-tone magnitude 934.

Software 920 may also determine an optical-fiber-channel length 936, of optical channel 662, as estimated chromatic dispersion 935 divided by chromatic dispersion coefficient 908. Units of chromatic dispersion 935 and chromatic dispersion coefficient 908 may be ps/nm and ps/(nm-km) respectively.

In embodiments, signal extractor 928 recovers a non-dispersed signal 910 by applying estimated chromatic dispersion 935 to chromatically-dispersed signal 915. Examples of non-dispersed signal 910 include signals 710 and 720.

Figure 10:
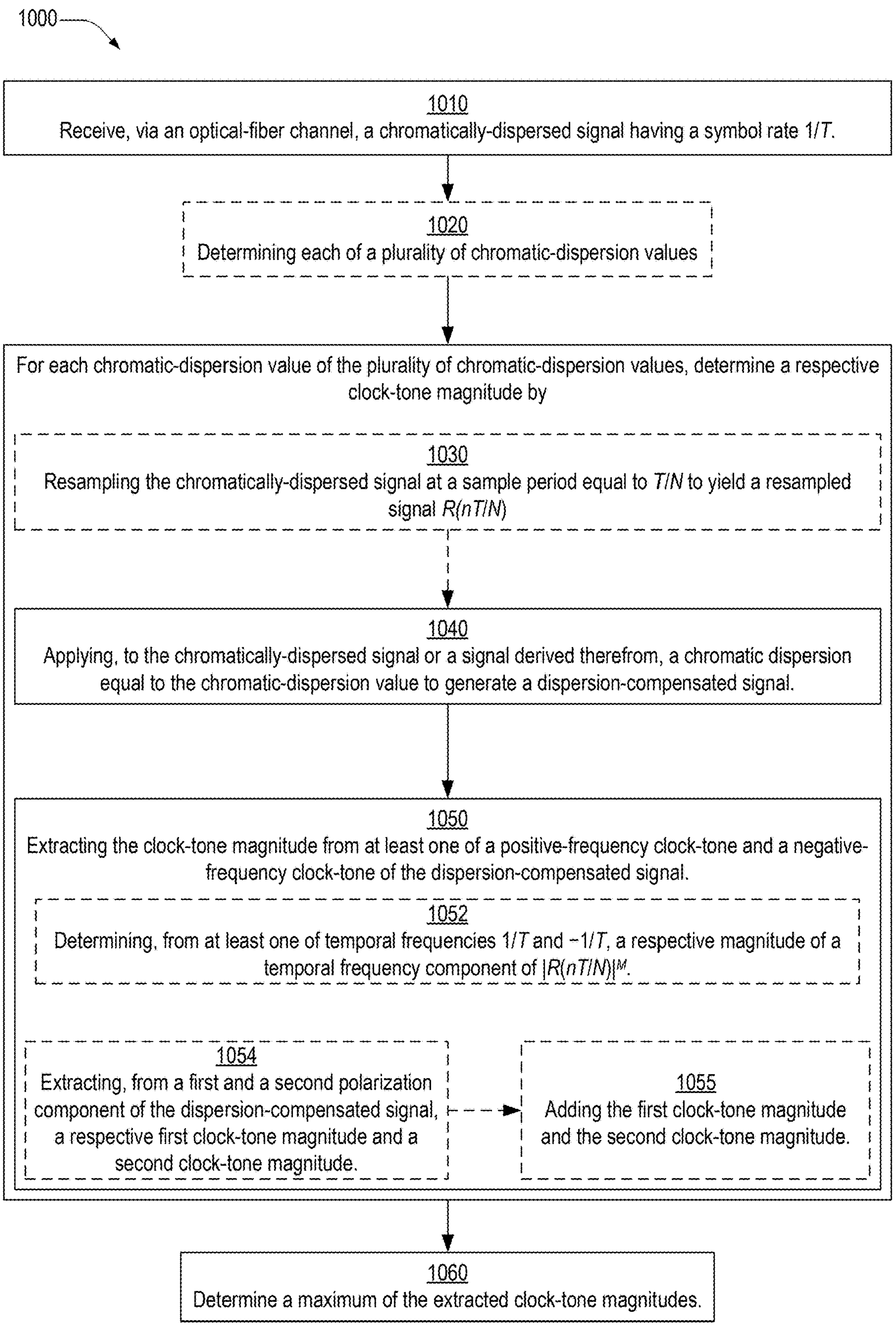
FIG. 10 is a flowchart illustrating a method for estimating a chromatic dispersion of an optical-fiber channel, in an embodiment.

FIG. 10 is a flowchart illustrating a method 1000 for estimating a chromatic dispersion of an optical-fiber channel. In embodiments, method 1000 is implemented within one or more aspects of dispersion compensator 900 that is part of ONU 630. For example, method 1000 may be implemented by processor 903 executing computer-readable instructions of software 920. Method 1000 includes steps 1010, 1040, 1050, and 1060. Method 1000 may also include at least one of steps 1020 and 1030.

Step 1010 includes receiving, via the optical-fiber channel, a chromatically-dispersed signal having a symbol rate 1/T. In an example of step 1010, dispersion compensator 900 receives chromatically-dispersed signal 915, which in this example has a symbol rate 1/T.

Step 1020 includes determining each of a plurality of chromatic-dispersion values. In an example of step 1010, dispersion compensator 900 determines chromatic-dispersion values, e.g., from chromatic dispersion coefficient 908 and an estimate of a length of optical channel 662.

Step 1030 includes resampling the chromatically-dispersed signal at a sample period equal to T/N to yield a resampled signal R(nT/N), where T is the symbol period of the chromatically-dispersed signal and N is a positive integer. In an example of step 1030, resampler 921 resamples detected signal 916 to yield resampled signal 931.

Step 1040 is executed for each chromatic-dispersion value of a plurality of chromatic-dispersion values, such as chromatic-dispersion values 907. Step 1040 includes applying, to the chromatically-dispersed signal or a signal derived therefrom, a chromatic dispersion equal to the chromatic-dispersion value to generate a dispersion-compensated signal. Applying the chromatic dispersion may include pre-compensating the chromatically-dispersed signal, or a signal derived therefrom, according to the chromatic-dispersion value.

In a first example of step 1040, dispersion compensator 922 generates each dispersion-compensated signal 932(*p*) by applying chromatic-dispersion value 907(*p*) to detected signal 916, where $p \in \mathbb{Z}$,, $p \geq 1$, and $p \leq P$. In a second example of step 1040, dispersion compensator 922 generates each dispersion-compensated signal 932(*q*) by applying chromatic-dispersion value 907(*p*) to resampled signal 931.

Step 1050 is also executed for each chromatic-dispersion value of a plurality of chromatic-dispersion values. Step 1050 includes extracting the clock-tone magnitude from at least one of a positive-frequency clock-tone and a negative-frequency clock-tone of the dispersion-compensated signal. The positive-frequency clock-tone and the negative-frequency clock-tone are spectral components of the dispersion-compensated signal at temporal frequencies 1/T or −1/T respectively. In an example of step 1050, for each dispersion-compensated signal 932(*p*), clock-tone extractor 924 executes equation (5) to extract each clock-tone magnitude 934(*p*) from at least one of a positive-frequency clock-tone and a negative-frequency clock-tone of dispersion-compensated signal 932(*p*). In embodiments, r(n) of equation (1) is a mathematical expression of a signal 932(*p*).

When method 1000 includes step 1030, step 1050 may include a step 1052. Step 1052 includes determining, from at least one of temporal frequencies 1/T and −1/T, a respective magnitude of a temporal frequency component of $|R(nT/N)|^M$, where M is greater than or equal to two. In an example of step 1052, R(n) of equation (5) is given by equation (6), and clock-tone extractor 924 executes equation (5) as in the above example of step 1050.

Step 1050 may include a step 1054, which includes extracting, from a first and a second polarization component of the dispersion-compensated signal, a respective first clock-tone magnitude and a second clock-tone magnitude. The second polarization component is orthogonal to the first polarization component. In an example of step 1054, for each dispersion-compensated signal 932(*p*), clock-tone extractor 924 executes equation (5) for each of two orthogonal polarizations of dispersion-compensated signal 932(*q*) to yield $S_x$ and $S_y$ of equation (7).

When step 1050 includes step 1054, it may also include a step 1055. Step 1055 includes adding the first clock-tone magnitude and the second clock-tone magnitude. In an example of step 1055, clock-tone extractor 924 determines, for each dispersion-compensated signal 932(*p*), a respective each clock-tone magnitude 934(*p*) as a sum of $S_x$ and $S_y$ of equation (7).

Step 1060 includes determining a maximum of the extracted clock-tone magnitudes. The estimated chromatic dispersion is the chromatic-dispersion value, of the plurality of chromatic-dispersion values, corresponding to the maximum extracted clock-tone magnitude. In an example of step 1060, dispersion estimator 925 determines estimated chromatic dispersion 935 as the maximum of clock-tone magnitudes 934(1-P).

Figure 11:
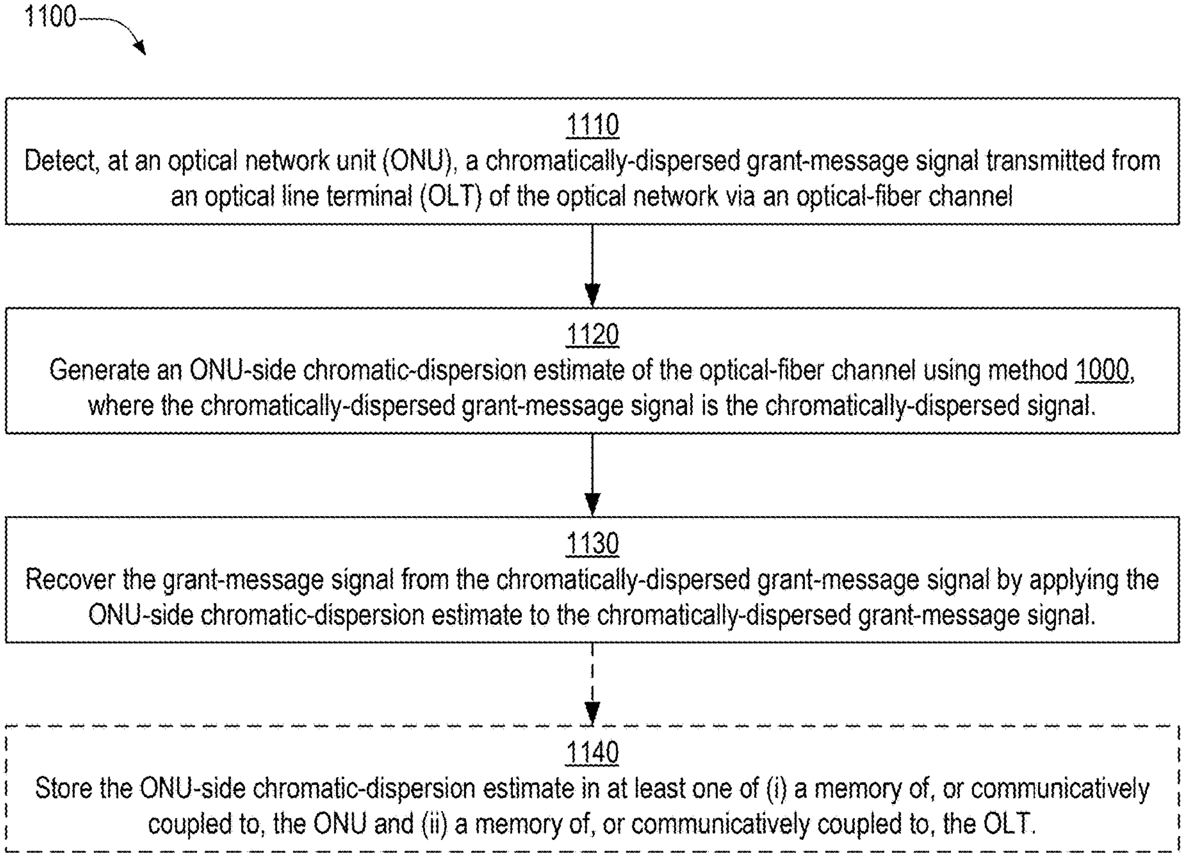
FIG. 11 is a flowchart illustrating a method for recovering a grant-message signal of an optical network, in an embodiment.

FIG. 11 is a flowchart illustrating a method 1100 for recovering a grant-message signal of an optical network. In embodiments, method 1100 is implemented within one or more aspects of dispersion compensator 900 that is part of ONU 630. For example, method 1100 may be implemented by processor 903 executing computer-readable instructions of software 920. Method 1000 includes steps 1110, 1120, and 1130, and may also include step 1140.

Step 1110 includes detecting, at an ONU, a chromatically-dispersed grant-message signal transmitted from an OLT of the optical network via an optical-fiber channel. In an example of step 1110, dispersion compensator 900 detects chromatically-dispersed signal 915.

Step 1120 includes generating an ONU-side chromatic-dispersion estimate of the optical-fiber channel using method 1000, where the chromatically-dispersed grant-message signal is the chromatically-dispersed signal. In an example of step 1120, ONU 630 includes dispersion compensator 900, which executes method 1000 to yield estimated chromatic dispersion 935.

Step 1130 includes recovering the grant-message signal from the chromatically-dispersed grant-message signal by applying the ONU-side chromatic-dispersion estimate to the chromatically-dispersed grant-message signal. In an example of step 1130, ONU 630 includes dispersion compensator 900, and signal extractor 928 of dispersion compensator 900 uses estimated chromatic dispersion 935 to recover non-dispersed signal 910 from chromatically-dispersed signal 915.

Step 1140 includes storing the ONU-side chromatic-dispersion estimate in at least one of (i) a memory of, or communicatively coupled to, the ONU and (ii) a memory of, or communicatively coupled to, the OLT. In example of step 1140, estimated chromatic dispersion 935 is stored in at least one of (i) memory 634 of ONU 630, (ii) memory 904 of ONU 630's dispersion compensator 900, and (iii) memory 614 of OLT 610.

Figure 12:
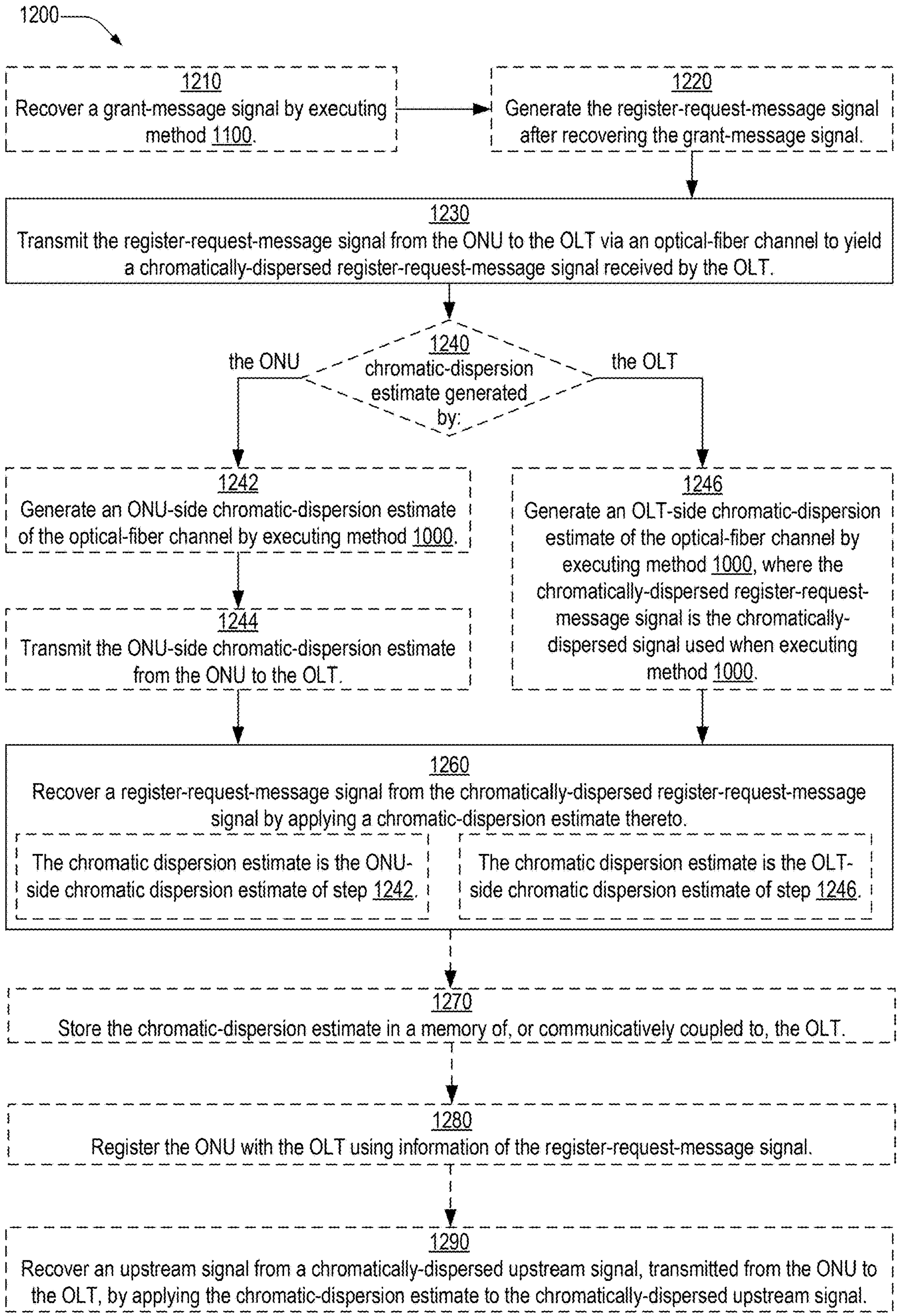
FIG. 12 is a flowchart illustrating a method for registering an ONU with an optical line terminal OLT, in an embodiment.

FIG. 12 is a flowchart illustrating a method 1200 for registering an ONU with an OLT. In embodiments, method 1200 is implemented within one or more aspects of both OLT 610 and ONU 630, when each includes a dispersion compensator 900. For example, method 1200 may be implemented by processor 903 executing computer-readable instructions of software 920. Method 1200 includes steps 1230, 1260, and may also include at least one of steps 1210, 1220, 1242, 1244, 1246, 1270, 1280, and 1290.

Step 1210 includes recovering a grant-message signal by executing method 1100. In an example of step 1210, dispersion compensator 900 of ONU 630 executes method 1100 to recover grant-message signal 710 from chromatically-dispersed signal 715.

Step 1220 includes generating a register-request-message signal after recovering the grant-message signal. In an example of step 1220, ONU 630 generates register-request message signal 720 after recovering grant-message signal 710.

Step 1230 includes transmitting a register-request-message signal from the ONU to the OLT via an optical-fiber channel to yield a chromatically-dispersed register-request-message signal received by the OLT. In an example of step 1230, ONU 630 transmits a register-request message signal 720 to OLT 610 via optical channel 662. Register-request message signal 720 arrives at OLT 610 as chromatically-dispersed signal 725, as shown in FIG. 7.

Step 1260 includes recovering a register-request-message signal from the chromatically-dispersed register-request-message signal by applying a chromatic-dispersion estimate to the chromatically-dispersed register-request-message signal. In an example of step 1260, OLT 610 recovers register-request-message signal 720 from chromatically-dispersed signal 725 by applying a chromatic-dispersion estimate to chromatically-dispersed signal 725.

Step 1240 is a decision, in which the chromatic-dispersion estimate of step 1260 is generated by either the ONU or the OLT. When the ONU generates the chromatic-dispersion estimate of step 1260, method 1200 includes step 1242, and may also include step 1244. When the OLT generates the chromatic-dispersion estimate of step 1260, method 1200 includes step 1246. Each of steps 1240, 1242, 1244, and 1246 are executed before step 1260.

Step 1242 includes generating an ONU-side chromatic-dispersion estimate of the optical-fiber channel by executing method 1000. In such embodiments, (i) the chromatically-dispersed signal used when executing method 1000 (step 1010) is the chromatically-dispersed register-request-message signal of step 1230, and (ii) the ONU-side chromatic-dispersion estimate resulting from step 1242 is the chromatic-dispersion estimate of step 1260. In an example of step 1242, ONU 630 includes dispersion compensator 900, which executes method 1000 to yield estimated chromatic dispersion 935.

Step 1244 is executed before step 1260, and includes transmitting the ONU-side chromatic-dispersion estimate from the ONU to the OLT. In an example of step 1244, ONU 630 transmits estimated chromatic dispersion 935 to OLT 610.

Step 1246 includes generating an OLT-side chromatic-dispersion estimate of the optical-fiber channel by executing the method 1000. In such embodiments, (i) the chromatically-dispersed signal used when executing method 1000 (step 1010) is the chromatically-dispersed register-request-message signal of step 1230, and (ii) the OLT-side chromatic-dispersion estimate resulting from step 1246 is the chromatic-dispersion estimate of step 1260. In an example of step 1246, OLT 610 includes dispersion compensator 900, which executes method 1000 to yield estimated chromatic dispersion 935.

Step 1270 includes, after executing step 1260, storing the chromatic-dispersion estimate in a memory of, or communicatively coupled to, the OLT. In example of step 1270, OLT 610 stores estimated chromatic dispersion 935 in either (i) memory 904 of its dispersion compensator 900, or (ii) memory 614.

Step 1280 includes registering the ONU with the OLT using information of the register-request-message signal. In an example of step 1280, OLT 610 registers ONU using information of register-request-message signal 720.

Step 1290 includes recovering an upstream signal from a chromatically-dispersed upstream signal, transmitted from the ONU to the OLT, by applying the chromatic-dispersion estimate to the chromatically-dispersed upstream signal. In an example of step 1290, ONU 630 transmits an upstream signal to OLT 610 via optical channel 662. OLT 610 receives the upstream signal as a chromatically-dispersed upstream signal. OLT 610 recovers the upstream signal from the chromatically-dispersed upstream signal by applying estimated chromatic dispersion 935 thereto.

2. Experimental Results

Figure 13:
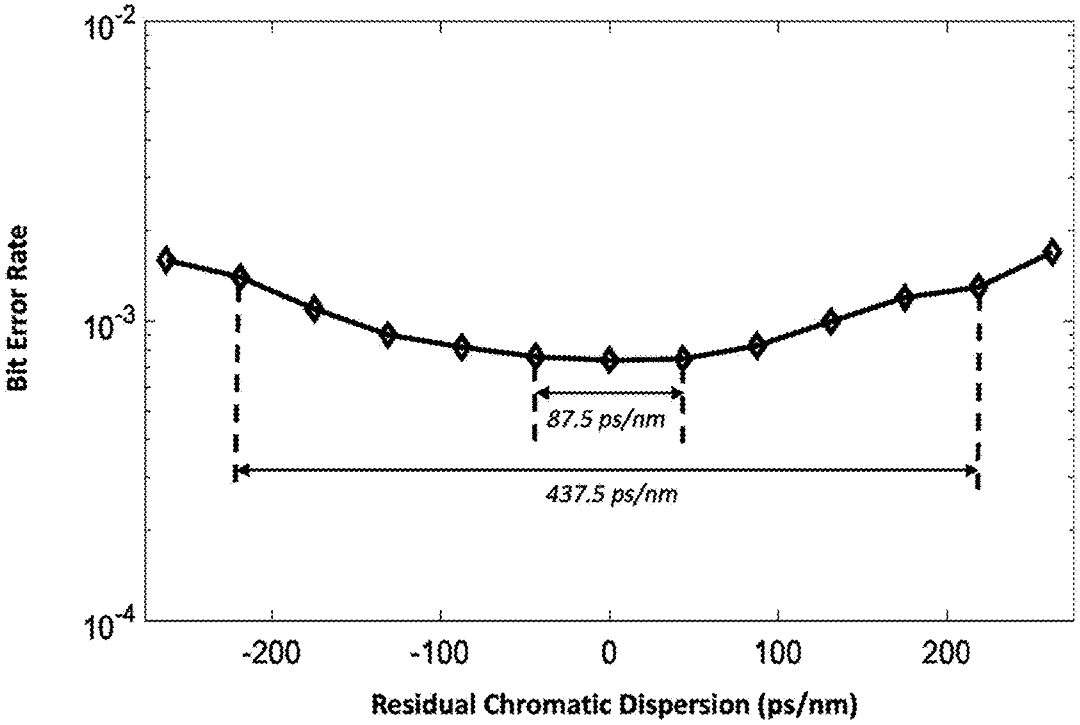
FIG. 13 is a plot of bit error rate as a function of residual chromatic dispersion, in an embodiment.

To verify the performance, we tested CD estimation method 1000 in a 100G PDM-QPSK system within 80-km fiber transmission distance (corresponding to about 1400 ps/nm). FIG. 13 shows the BER performance as a function of residual CD. Residual CD impacts on the performance of other DSP functions in the coherent receiver, including retiming, channel equalization and carrier recovery. We confirm that there is no obvious penalty when the residual CD is within 87.5 ps/nm (−43.75 to +43.75 ps/nm); while there would be about 0.5-dB receive power penalty for residual CD within 437.5 ps/nm (−218.75 to +218.75 ps/nm). These numbers will determine the required accuracy for CD estimation, and the corresponding computation complexity.

Figure 14:
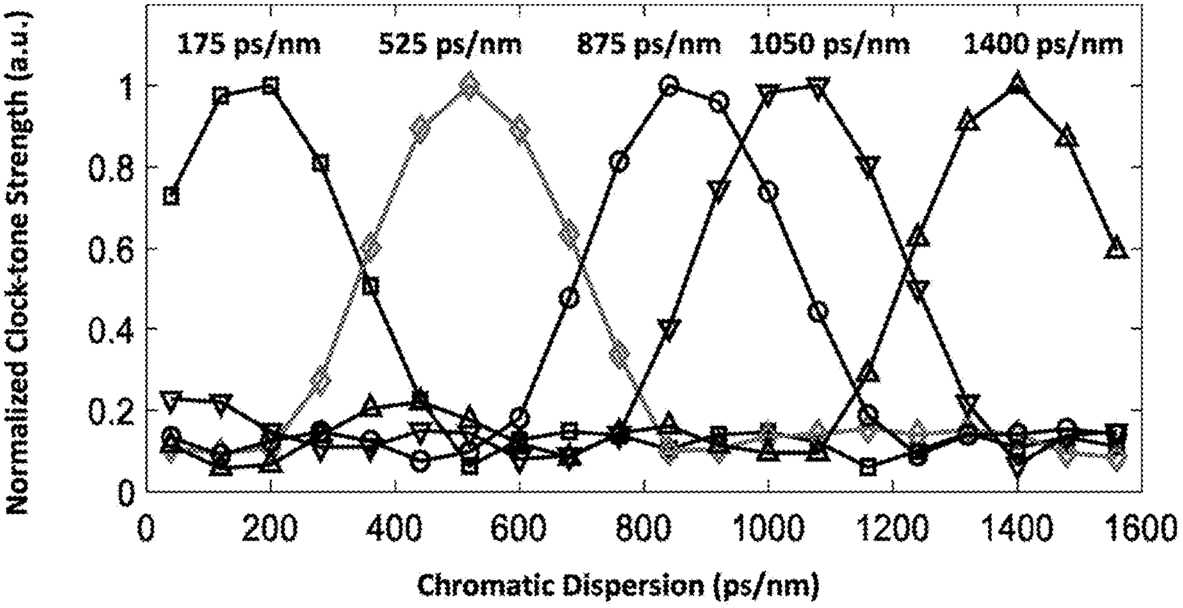
FIG. 14 is a plot of normalized clock-tone strength as a function of chromatic dispersion for clock tones pre-compensated with different estimations of chromatic dispersion.
Figure 15:
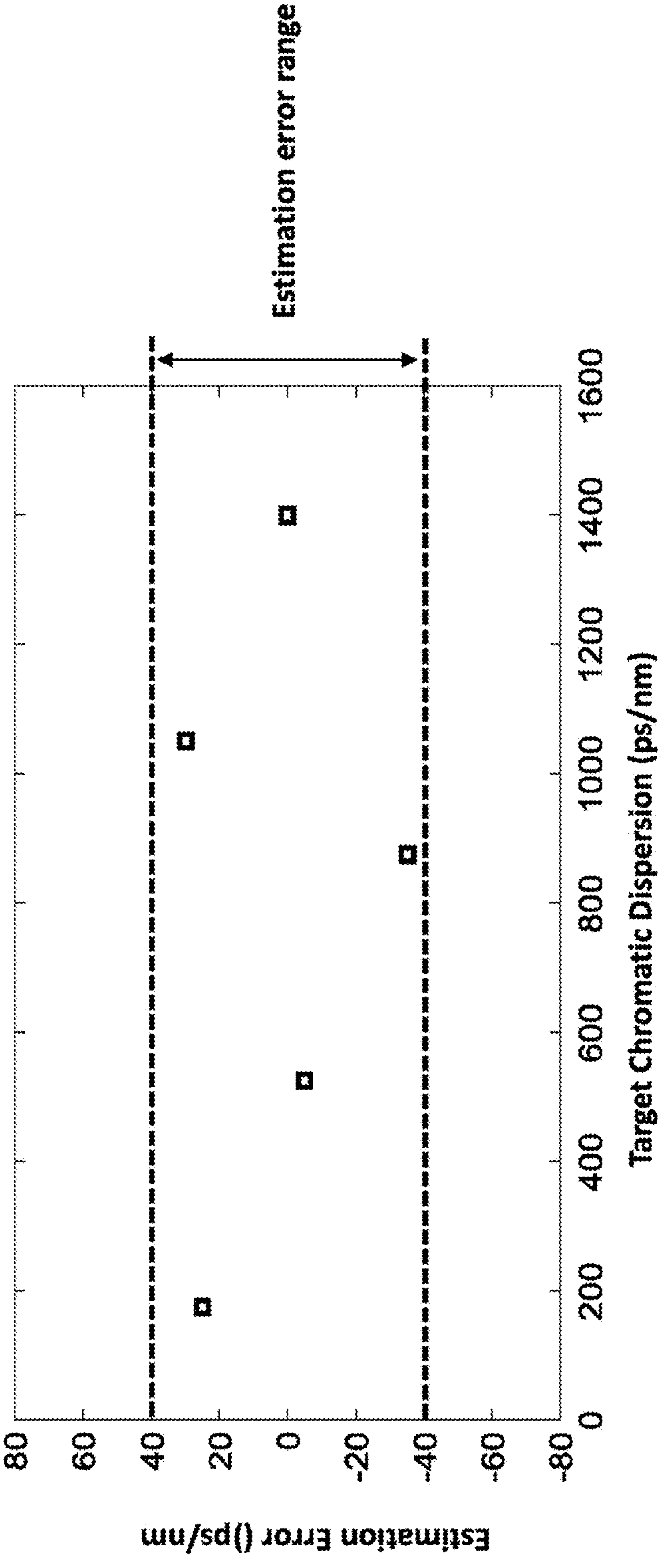
FIG. 15 is a plot of estimation error of the estimated chromatic dispersion values of FIG. 14, in an embodiment.

Based on the results of FIG. 13, now we design the CD estimation by using Q=20 paths of parallel processing. The estimation range is set at 1600 μm/nm, which makes the estimation accuracy to be 80 ps/nm (−40 to +40 ps/nm). By the achieved estimation accuracy established in the performance verification of FIG. 13, there should no obvious penalty for any CD estimation in the 1600 ps/nm range. In this estimation, we used 256 symbols for estimation to cover the CD estimation range. FIG. 14 shows the normalized clock-tone strength for different estimations of chromatic dispersion. Here, five target chromatic dispersion values are estimated (175, 525, 875, 1060 and 1400 ps/nm) To confirm the estimation accuracy, FIG. 15 shows the estimation error as a function of target chromatic dispersions. The estimation errors plotted in FIG. 15 confirm that the estimation error is within the error range from −40 to +40 ps/nm for all the five estimations tested.

Figure 16:
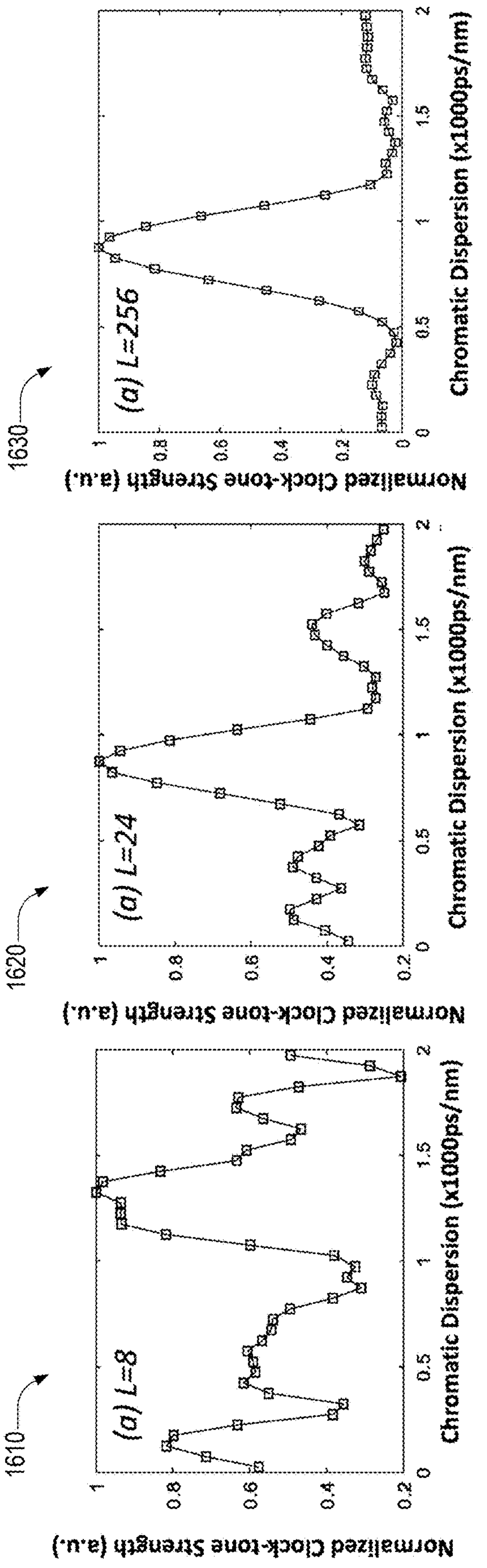
FIG. 16 includes three plots of clock-tone strength as a function of chromatic dispersion value with different estimation symbol lengths, in an embodiment.

We also test the CD estimation of method 1000 under different length of estimation symbols. FIG. 16 shows the normalized clock-tone strength as a function of chromatic dispersion with different estimation lengths L: L=8, L=24, and L=256 respectively in plots 1610, 1620, and 1630. Here the target CD is 875 ps/nm. Plot 1610 shows that L=8 is not sufficient for estimation for the target CD, which will cause wrong estimation when doing peak search. Plots 1620 and 1630 show that increasing estimation length improves estimation performance.

Figure 17:
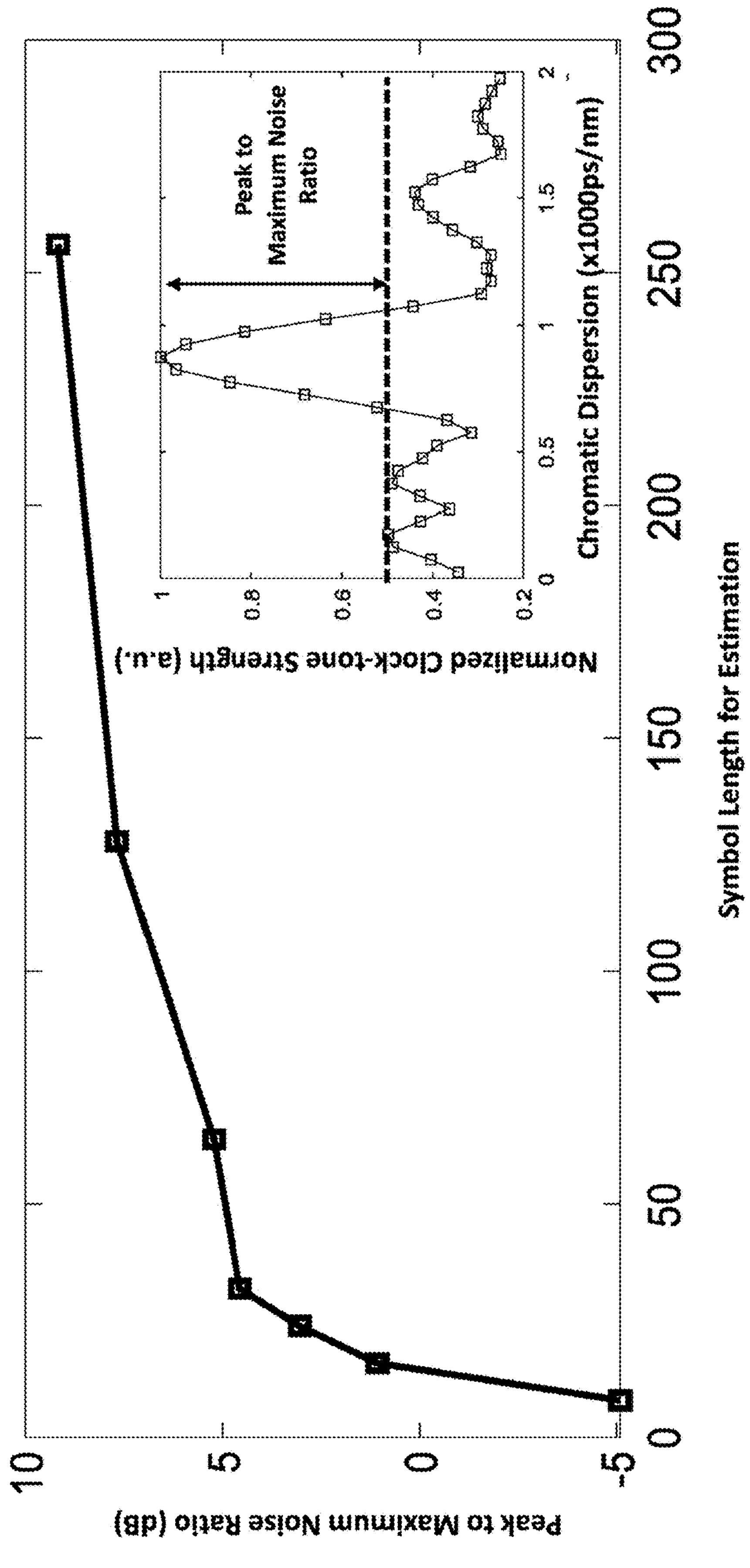
FIG. 17 is a plot of peak-to-maximum noise ratio as function of symbol length for chromatic dispersion estimation, in an embodiment.

To quantify the peak search performance during CD estimation, we define a ratio between the real clock-tone strength peak at target CD value and the maximum clock-tone strength on other CD values. The larger the ratio, the better performance, and the lower error chance for peak search. FIG. 17 shows the ratio as a function of symbol length for CD estimation, where the received optical power is maintained at −37 dBm. We can see that at least 24 symbols are required for the peak-to-maximum-noise-ratio to exceed 3-dB. Increasing the number of symbols used for estimation increases the ratio of peak clock-tone strength to maximum noise. In a practical system, one should balance the computation complexity and the peak search performance. For instance, an estimation length of L=256 symbols is long enough for achieve a ratio close to 10-dB.

REFERENCES

[1] D. Wang, C. Lu, A. P. T. Lau, and S. He, "Adaptive chromatic-dispersion compensation for coherent communication systems using delay-tap sampling technique," IEEE Photon. Technol. Lett., vol. 23, no. 14, pp. 1016-1018 Jul. 15, 2011.

[2] Qi Sui, Alan Pak Tao Lau, and Chao Lu, "Fast and Robust Blind Chromatic Dispersion Estimation Using Auto-Correlation of Signal Power Waveform for Digital Coherent Systems," J. Lightwave Technol. 31, 306-312 (2013)

[3] Y. Zhang, Y. Li, M. Yu, S. Fan, J. Qiu, H. Guo, X. Hong, and J. Wu, "Adaptive Blind Chromatic Dispersion Estimation and Compensation for DSP-based Coherent Optical Systems," in 2017 Conference on Lasers and Electro-Optics Pacific Rim, (Optical Society of America, 2017), paper s1912.

[4] M. Oerder and H. Meyr, "Digital filter and square timing recovery," in IEEE Transactions on Communications, vol. 36, no. 5, pp. 605-612, May 1988.

Changes may be made in the above chromatic-dispersion compensation methods and systems without departing from the scope of the present embodiments. It should thus be noted that the matter contained in the above description or shown in the accompanying drawings should be interpreted as illustrative and not in a limiting sense. Herein, and unless otherwise indicated, the phrase "in embodiments" is equivalent to the phrase "in certain embodiments," and does not refer to all embodiments. The following claims are intended to cover all generic and specific features described herein, as well as all statements of the scope of the present chromatic-dispersion compensation methods and system, which, as a matter of language, might be said to fall therebetween.

What is claimed is:

1. A method for registering an optical network unit (ONU) with an optical line terminal (OLT), comprising:

transmitting a register-request-message signal from the ONU to the OLT via an optical-fiber channel to yield a chromatically-dispersed register-request-message signal received by the OLT and having a symbol rate 1/T; and generating an ONU-side chromatic-dispersion estimate of the optical-fiber channel by:

receiving, via the optical-fiber channel, the chromatically-dispersed register-request-message signal;

for each chromatic-dispersion value of a plurality of chromatic-dispersion values, determining a respective clock-tone magnitude by:

applying, to the chromatically-dispersed signal or a signal derived therefrom, a chromatic dispersion equal to the chromatic-dispersion value to generate a dispersion-compensated signal; and extracting the clock-tone magnitude from at least one of a positive-frequency clock-tone and a negative-frequency clock-tone of the dispersion-compensated signal, the positive-frequency clock-tone and the negative-frequency clock-tone being spectral components of the dispersion-compensated signal at temporal frequencies 1/T or −1/T respectively; and determining a maximum of the extracted clock-tone magnitudes, the estimated chromatic dispersion being the chromatic-dispersion value, of the plurality of chromatic-dispersion values, corresponding to the maximum extracted clock-tone magnitude, recovering a register-request-message signal from the chromatically-dispersed register-request-message signal by applying the ONU-side chromatic-dispersion estimate to the chromatically-dispersed register-request-message signal.

2. The method of claim 1, further comprising, before said recovering a register-request-message signal, transmitting the ONU-side chromatic-dispersion estimate from the ONU to the OLT.

3. The method of claim 1, further comprising, after recovering the register-request-message signal, storing the chromatic-dispersion estimate in a memory of, or communicatively coupled to, the OLT.

4. The method of claim 1, further comprising registering the ONU with the OLT using information of the register-request-message signal.

5. The method of claim 4, further comprising:

recovering an upstream signal from a chromatically-dispersed upstream signal, transmitted from the ONU to the OLT, by applying the chromatic-dispersion estimate to the chromatically-dispersed upstream signal.

6. The method of claim 1, extracting the respective clock-tone magnitude comprising:

extracting, from a first and a second polarization component of the dispersion-compensated signal, a respective first clock-tone magnitude and a second clock-tone magnitude, the second polarization component being orthogonal to the first polarization component.

7. The method of claim 1, further comprising determining a length of the optical-fiber channel from the estimated chromatic dispersion and a chromatic-dispersion coefficient of the optical-fiber channel.

8. The method of claim 1, said applying comprising pre-compensating the chromatically-dispersed signal according to the chromatic-dispersion value.

9. A method for registering an optical network unit (ONU) with an optical line terminal (OLT), comprising:

transmitting a register-request-message signal from the ONU to the OLT via an optical-fiber channel to yield a chromatically-dispersed register-request-message signal received by the OLT;

recovering a grant-message signal of the optical network by:

(a) detecting, at the ONU, a chromatically-dispersed grant-message signal transmitted from the OLT via the optical-fiber channel and having a symbol rate 1/T;

(b) estimating an ONU-side chromatic-dispersion estimate of the optical-fiber channel by:

(i) receiving, via the optical-fiber channel, the chromatically-dispersed grant-message signal;

(ii) for each chromatic-dispersion value of a plurality of chromatic-dispersion values, determining a respective clock-tone magnitude by:

applying, to the chromatically-dispersed grant-message signal or a signal derived therefrom, a chromatic dispersion equal to the chromatic-dispersion value to generate a dispersion-compensated signal; and extracting the clock-tone magnitude from at least one of a positive-frequency clock-tone and a negative-frequency clock-tone of the dispersion-compensated signal, the positive-frequency clock-tone and the negative-frequency clock-tone being spectral components of the dispersion-compensated signal at temporal frequencies 1/T or −1/T respectively; and (iii) determining a maximum of the extracted clock-tone magnitudes, the estimated chromatic dispersion being the chromatic-dispersion value, of the plurality of chromatic-dispersion values, corresponding to the maximum extracted clock-tone magnitude; and (c) recovering the grant-message signal from the chromatically-dispersed grant-message signal by applying the ONU-side chromatic-dispersion estimate to the chromatically-dispersed grant-message signal.

10. The method of claim 9, further comprising: generating the register-request-message signal after recovering the grant-message signal.

11. The method of claim 9, further comprising, after recovering the register-request-message signal, storing the ONU-side chromatic-dispersion estimate in a memory of, or communicatively coupled to, the OLT.

12. The method of claim 9, further comprising registering the ONU with the OLT using information of the register-request-message signal.

13. The method of claim 12, further comprising:

recovering an upstream signal from a chromatically-dispersed upstream signal, transmitted from the ONU to the OLT, by applying the chromatic-dispersion estimate to the chromatically-dispersed upstream signal.

14. The method of claim 9, extracting the respective clock-tone magnitude comprising:

extracting, from a first and a second polarization component of the dispersion-compensated signal, a respective first clock-tone magnitude and a second clock-tone magnitude, the second polarization component being orthogonal to the first polarization component.

15. The method of claim 9, further comprising determining a length of the optical-fiber channel from the estimated chromatic dispersion and a chromatic-dispersion coefficient of the optical-fiber channel.

16. The method of claim 9, said applying comprising pre-compensating the chromatically-dispersed signal according to the chromatic-dispersion value.

17. A method for registering an optical network unit (ONU) with an optical line terminal (OLT), comprising:

transmitting a register-request-message signal from the ONU to the OLT via an optical-fiber channel to yield a chromatically-dispersed register-request-message signal received by the OLT and having a symbol rate 1/T;

generating an OLT-side chromatic-dispersion estimate of the optical-fiber channel by:

(i) receiving, via the optical-fiber channel, the chromatically-dispersed register-request-message signal;

(ii) for each chromatic-dispersion value of a plurality of chromatic-dispersion values, determining a respective clock-tone magnitude by:

applying, to the chromatically-dispersed register-request-message signal, a chromatic dispersion equal to the chromatic-dispersion value to generate a dispersion-compensated signal; and extracting the clock-tone magnitude from at least one of a positive-frequency clock-tone and a negative-frequency clock-tone of the dispersion-compensated signal, the positive-frequency clock-tone and the negative-frequency clock-tone being spectral components of the dispersion-compensated signal at temporal frequencies 1/T or −1/T respectively; and determining a maximum of the extracted clock-tone magnitudes, the estimated chromatic dispersion being the chromatic-dispersion value, of the plurality of chromatic-dispersion values, corresponding to the maximum extracted clock-tone magnitude, recovering a register-request-message signal from the chromatically-dispersed register-request-message signal by applying the OLT-side chromatic-dispersion estimate to the chromatically-dispersed register-request-message signal.

18. The method of claim 17, further comprising, after recovering the register-request-message signal, storing the chromatic-dispersion estimate in a memory of, or communicatively coupled to, the OLT.

19. The method of claim 17, further comprising registering the ONU with the OLT using information of the register-request-message signal.

20. The method of claim 19, further comprising:

recovering an upstream signal from a chromatically-dispersed upstream signal, transmitted from the ONU to the OLT, by applying the chromatic-dispersion estimate to the chromatically-dispersed upstream signal.

* * * * *